United States Patent
Adachi

(10) Patent No.: US 8,170,149 B2
(45) Date of Patent: May 1, 2012

(54) OFDM RECEIVER APPARATUS

(75) Inventor: Naoto Adachi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 943 days.

(21) Appl. No.: 11/958,579

(22) Filed: Dec. 18, 2007

(65) Prior Publication Data

US 2008/0152042 A1 Jun. 26, 2008

(30) Foreign Application Priority Data

Dec. 22, 2006 (JP) ................. 2006-346675

(51) Int. Cl.
*H04L 27/22* (2006.01)
(52) U.S. Cl. ........ 375/330; 375/283; 375/260; 375/331; 375/335; 375/357; 375/358; 375/354; 329/304; 329/310; 329/309
(58) Field of Classification Search ............ 375/260, 375/343, 150, 283, 330–332, 354, 355, 357, 375/367, 358; 329/304, 306, 310, 309
See application file for complete search history.

(56) References Cited

U.S. PATENT DOCUMENTS

| 5,638,406 | A * | 6/1997 | Sogabe | 375/326 |
| 6,983,029 | B2 * | 1/2006 | Alavi et al. | 375/329 |
| 7,272,168 | B2 * | 9/2007 | Akopian | 375/150 |
| 7,301,969 | B2 * | 11/2007 | Miyashita et al. | 370/513 |

FOREIGN PATENT DOCUMENTS

| JP | 7-250120 | | 9/1995 |
| JP | 8-65292 | A | 3/1996 |
| JP | 9-289470 | | 11/1997 |
| JP | 2000-115122 | | 4/2000 |
| JP | 2000-299676 | | 10/2000 |
| JP | 2000-324081 | A | 11/2000 |
| JP | 2002-247003 | | 8/2002 |
| JP | 2003-023410 | A | 1/2003 |
| JP | 2004-297215 | | 10/2004 |
| JP | 2004-297215 | * | 12/2004 |

OTHER PUBLICATIONS

Japanese Office Action issued on Nov. 28, 2008 in corresponding Japanese Patent Application 10-2007-135304.
"Japanese Office Action" mailed by JPO and corresponding to Japanese application No. 2006-346675 on May 24, 2011.
Japanese Office Action mailed Dec. 6, 2011 for corresponding Japanese Application No. 2006-346675, with partial English-language translation.

* cited by examiner

*Primary Examiner* — Eva Puente
*Assistant Examiner* — Rahel Guarino
(74) *Attorney, Agent, or Firm* — Fujitsu Patent Center

(57) ABSTRACT

An OFDM receiver apparatus receives an OFDM signal including a plurality of DBPSK signals transmitting identical information. An extraction unit extracts the plurality of DBPSK signals from the OFDM signal. A phase difference calculation unit calculates a phase difference between symbols of each of the plurality of extracted DBPSK signals. An accumulation unit accumulates the plurality of phase differences. A decision unit decides data transmitted by the DBPSK signals on the basis of an accumulation result.

12 Claims, 17 Drawing Sheets

BECAUSE THERE ARE EIGHT "0"
AND FOUR "1",
"0" IS DETERMINED AS A
RESULT OF MAJORITY DECISION

| Bit | | OVERVIEW | | |
|---|---|---|---|---|
| 0 | 1 | DEFFERENTIAL DEMUDULATION STANDARD | | |
| 1~16 | 16 | SYNCHRONIZATION SIGNAL | | |
| 17~19 | 3 | SEGMENT TYPE IDENTIFICATION | | |
| 20~21 | 2 | SYSTEM IDENTIFICATION | | |
| 22~25 | 4 | TRANSMISSION PARAMETER SWITCHING INDEX | | |
| 26 | 1 | EMERGENCY ALERT BROADCASTING ACTIVATION FLAG | | |
| 27 | 1 | | | PARTIAL RECEPTION FLAG |
| 28~30 | 3 | | A | MODULATION METHOD |
| 31~33 | 3 | | A | CONVOLUTIONAL CODE RATE |
| 34~36 | 3 | | A | INTERLEAVE LENGTH |
| 37~40 | 4 | | A | NUMBER OF SEGMENTS |
| 41~43 | 3 | CURRENT INFORMATION | B | MODULATION METHOD |
| 44~46 | 3 | | B | CONVOLUTIONAL CODE RATE |
| 47~49 | 3 | | B | INTERLEAVE LENGTH |
| 50~53 | 4 | | B | NUMBER OF SEGMENTS |
| 54~56 | 3 | | C | MODULATION METHOD |
| 57~59 | 3 | | C | CONVOLUTIONAL CODE RATE |
| 60~62 | 3 | | C | INTERLEAVE LENGTH |
| 63~66 | 4 | | C | NUMBER OF SEGMENTS |
| 67 | 1 | | | PARTIAL RECEPTION FLAG |
| 68~70 | 3 | | A | MODULATION METHOD |
| 71~73 | 3 | | A | CONVOLUTIONAL CODE RATE |
| 74~76 | 3 | | A | INTERLEAVE LENGTH |
| 77~80 | 4 | | A | NUMBER OF SEGMENTS |
| 81~83 | 3 | NEXT INFORMATION | B | MODULATION METHOD |
| 84~86 | 3 | | B | CONVOLUTIONAL CODE RATE |
| 87~89 | 3 | | B | INTERLEAVE LENGTH |
| 90~93 | 4 | | B | NUMBER OF SEGMENTS |
| 94~96 | 3 | | C | MODULATION METHOD |
| 97~99 | 3 | | C | CONVOLUTIONAL CODE RATE |
| 100~102 | 3 | | C | INTERLEAVE LENGTH |
| 103~106 | 4 | | C | NUMBER OF SEGMENTS |
| 107~109 | 3 | ※PHASE CORRECTION IN CONCATENATED TRANSMISSION | | |
| 110~121 | 12 | Reserve (All '1') | | |
| 122~203 | 82 | ERROR CORRECTION PARITY | | |

| | | |
|---|---|---|
| SEGMENT TYPE IDENTIFICATION | 000 | SYNCHRONIZATION DEMODULATION |
| | 111 | DIFFERENTIAL DEMULATION |
| SYTEM IDENTIFICATION | 00 | DIGITAL TERRESTRIAL tv BROADCASTING SYSTEM |
| | 01 | TERRESTRIAL AUDIO BROADCASTING SYSTEM |
| | 1x | Reserve |
| TRANSMISSION PRAMETER SWITCHING INDEX | 1111 | NORMAL VALUE |
| | 1110~0000 | PARAMETER SWITCHED AFTER (VALUE-1) |
| EMERGENCY ALERT BROADCASTING ACTIVATION FLAG | 0 | Disable |
| | 1 | Enable |
| PARTIAL RECEPTION FLAG | 0 | Disable |
| | 1 | Enable |
| MODULATION METHOD | 000 | DQPSK |
| | 001 | QPSK |
| | 010 | 16QAM |
| | 011 | 64QAM |
| | 100~110 | Reserve |
| | 111 | UNUSED LEVEL |
| CONVOLUTIONAL CODE RATE | 000 | 1/2 |
| | 001 | 2/3 |
| | 010 | 3/4 |
| | 011 | 5/6 |
| | 100 | 7/8 |
| | 101~110 | Reserve |
| | 111 | UNUSED LEVEL |
| INTERLEAVE LENGTH | 000 | 0 |
| | 001 | 4 (Mode1), 2 (Mode2), 1 (Mode3) |
| | 010 | 8 (Mode1), 4 (Mode2), 2 (Mode3) |
| | 011 | 16 (Mode1), 8 (Mode2), 4 (Mode3) |
| | 100 | 32 (Mode1), 16 (Mode2), 8 (Mode3) |
| | 101~110 | Reserve |
| | 111 | UNUSED LEVEL |
| NUMBER OF SEGMENTS | 0000 | Reserve |
| | 0001~1101 | VALUE INDICATES NUMBER OF SEGMENTS |
| | 1110 | Reserve |
| | 1111 | UNUSED LEVEL |
| ※PHASE CORRECTION IN CONCATENATED TRANSMISSION | 000 | $-\pi/4$ |
| | 001 | $-2\pi/4$ |
| | 010 | $-3\pi/4$ |
| | 011 | $-4\pi/4$ |
| | 100 | $-5\pi/4$ |
| | 101 | $-6\pi/4$ |
| | 110 | $-7\pi/4$ |
| | 111 | 0 |

※ IS USED ONLY AUDIO BROADCASTING SYSTEM

F I G. 6

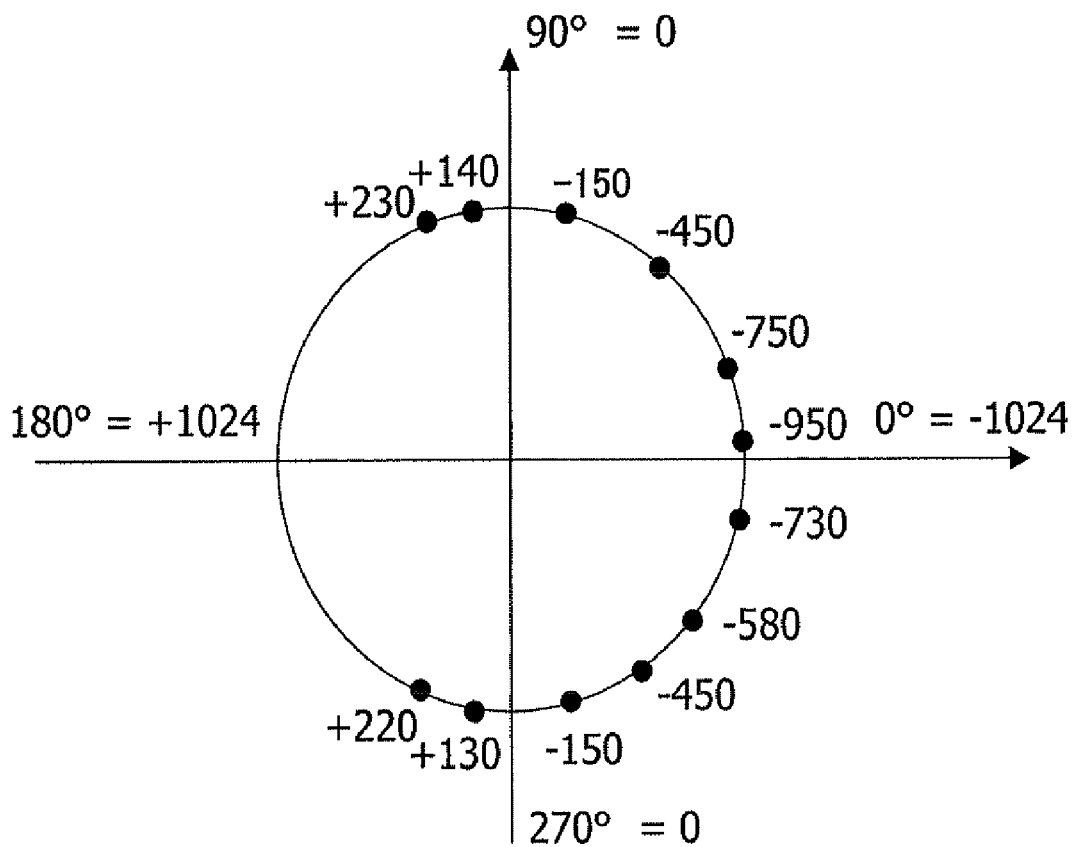
F I G. 8

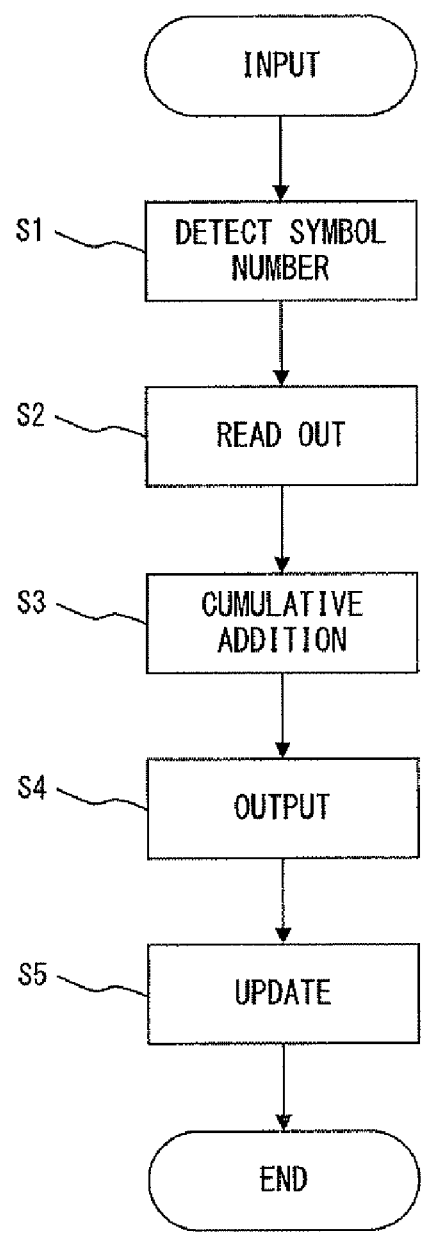
F I G. 1 1

| SYMBOL NUMBER | CORRELATION VALUE (CUMULATIVE VALUE) |
|---|---|
| 0 | −2 |
| 1 | −4 |
| 2 | +17 |
| 3 | +1 |
| ⋮ | ⋮ |
| 203 | +3 |

F I G. 1 5

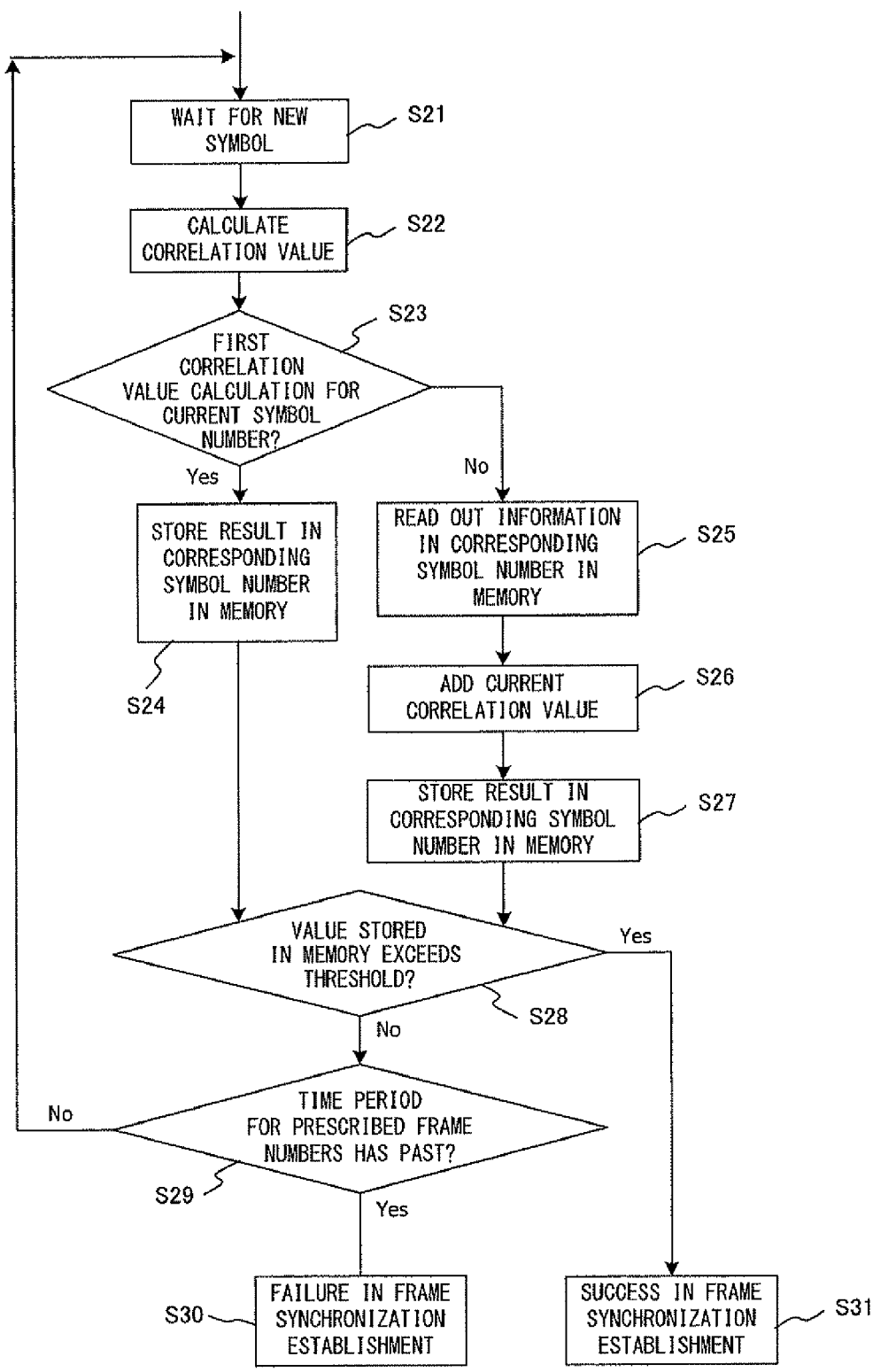
F I G. 16

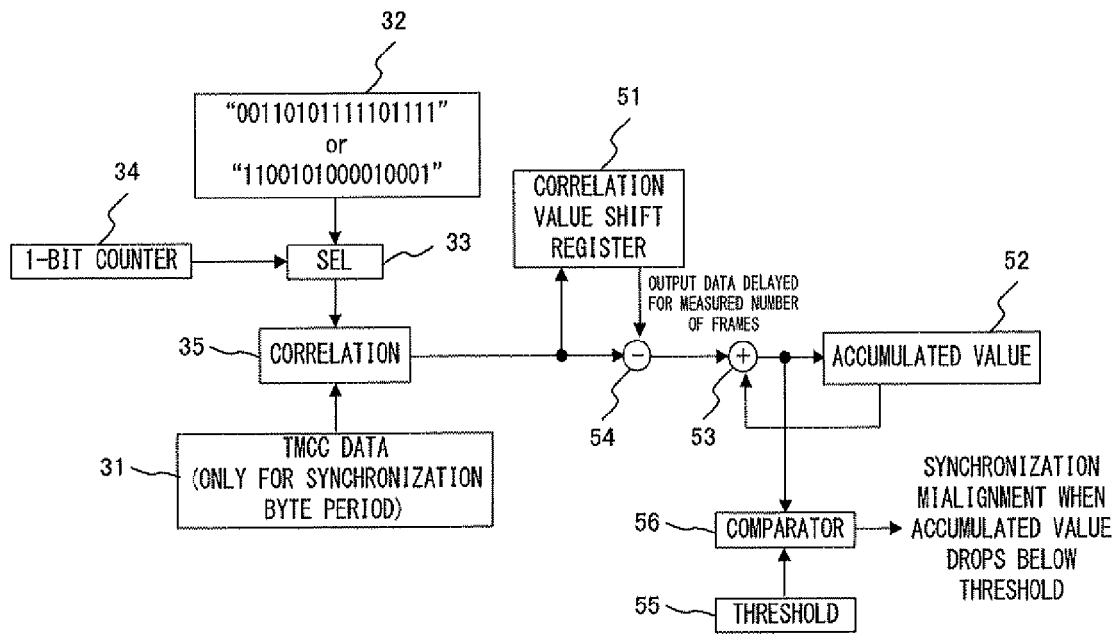
F I G. 17

OFDM RECEIVER APPARATUS

CROSS REFERENCE TO RELATED APPLICATION

This application is based upon and claims the benefit of priority from the prior Japanese Patent Application No. 2006-346675, filed on Dec. 22, 2006, the entire contents of which are incorporated herein by reference.

BACKGROUND OF THE INVENTION

1. Field of the Invention

The present invention relates to an OFDM receiver apparatus for receiving and demodulating an OFDM signal, and specifically to a demodulator circuit for demodulating a DBPSK signal in an OFDM receiver apparatus for digital terrestrial broadcasting and a circuit for detecting frame synchronization.

2. Description of the Related Art

In recent years, OFDM (Orthogonal Frequency Division Multiplexing) has been proposed as a method for transmitting digital signals. In OFDM, data is transmitted by using plural carriers, which are orthogonal to each other in a frequency domain. For that reason, an OFDM transmitter apparatus modulates transmitting signal using IFFT (Inverse Fast Fourier Transformation), and an OFDM receiver apparatus demodulates the received signal using FFT (Fast Fourier Transformation). Because frequency use efficiency is high, application of OFDM to the digital terrestrial broadcasting has been under consideration at large. Note that OFDM is adopted in ISDB-T (Integrated Services Digital Broadcasting-Terrestrial), which is a standard of the digital terrestrial broadcasting in Japan. OFDM is also adopted in DVB-T or DVB-H in Europe.

In the digital terrestrial broadcasting, control information is transmitted together with data. The data is transmitted by data carriers, and the control information is transmitted by TMCC (Transmission and Multiplexing Configuration Control) carriers. Here, the control information contains information for detecting frame synchronization, information for demodulating data signals and others. Therefore, accurate determination of the TMCC data transmitted by the TMCC carriers is important.

FIG. 1 is a diagram explaining a conventional data decision method. It should be noted that the TMCC signal is a DBPSK (Differential Binary Phase Shift Keying) signal. In DBPSK, a 1-bit digital signal is transmitted by using a phase difference ("zero" or "π") between two successive symbols. The OFDM signal of the digital terrestrial broadcasting contains plural TMCC signals for transmitting the same information in parallel in order to raise reliability.

In FIG. 1, an FFT circuit 101 converts an OFDM signal into a frequency domain signal. As a result, a data signal, a TMCC signal and others can be obtained. A phase difference calculation circuit 102 sequentially calculates phase differences between symbols of the TMCC signal obtained by the FFT circuit 101. A BPSK demodulator 103 generates 1-bit digital data for every symbols based on the phase difference information obtained by the phase difference calculation circuit 102. Here, the phase difference calculation circuit 102 and the BPSK demodulator 103 perform the above processing on each of the TMCC signals. Consequently, plural 1-bit data can be obtained for every 1-symbol time. A majority decision circuit 104 performs a majority decision procedure on the plural 1-bit data, and outputs likelihood data (data in the majority). As a result, the TMCC data is regenerated. As an example shown in FIG. 2, in a system where 12 TMCC signals are transmitted in parallel, "0" is detected from eight TMCC signals and "1" is detected from four TMCC signals. In such a case, the transmission data is determined as "0".

As described above, the TMCC signal that requires high reliability is demodulated by using the majority decision. Note that a technique to demodulate the TMCC signal is described in Patent Document 1 (Japanese Patent Application Publication No. 2002-247003), for example. In the demodulating circuit described in Patent Document 1, the majority decision is made by only using TMCC signals with the reception level larger than a threshold.

A receiver apparatus of the digital terrestrial broadcasting establishes frame synchronization by utilizing synchronization data contained in the TMCC data. The data is generated by executing demodulating processing with synchronization timing as a reference.

FIG. 3 is a diagram explaining a conventional frame synchronization detection method. Note that the synchronization data in ISDB-T is "w0=0011010111101110" or "w1=1100101000010001".

In FIG. 3, a known data register 111 stores synchronization data w0 and w1. The TMCC data obtained as above is sequentially input to a shift register 112. In other words, the shift register 112 holds the latest 16-bit TMCC data in sequence. A comparator 113 compares the synchronization data stored in the known data register 111 with the 16-bit data held in the shift register 112. If the number of bits matching each other is larger than the predetermined threshold (e.g. 14), a synchronization signal indicating the establishment of frame synchronization is output. Note that a known method includes that when a condition in which the number of bits matching each other is larger than the threshold is detected successively for a prescribed times, establishment of the frame synchronization is determined.

As related technologies, Patent Document 2 (Japanese Patent Application Publication No. H07-250120) describes a method for establishing the frame synchronization. Patent Documents 3 (Japanese Patent Application Publication No. 2000-115122) and 4 (Japanese Patent Application Publication No. 2000-299676) describe a method for establishing the symbol synchronization in an OFDM receiver apparatus.

In a case of receiving the digital terrestrial broadcasting with a mobile terminal such as a mobile phone, there is a frequent occurrence of fading phenomena in which the reception level of the radio waves fluctuates. Because reception power is reduced under a strongly fading environment, sometimes signals cannot be demodulated temporarily. At that time, if the TMCC information regeneration fails, the receiver apparatus can not recognize a demodulation method, the transmission data would not be regenerated at all.

Similarly under a strongly fading environment, the synchronization data is not accurately regenerated, and there is a possibility that the frame synchronization cannot be established. In this case, again, the transmission data cannot be regenerated at all. If the threshold for the synchronization decision is lowered (i.e. if some errors are accepted), the synchronization would be more easily established. However, the lower threshold increases the likelihood of erroneous synchronization (i.e. synchronization signal is output at a wrong timing).

The conventional OFDM receiver apparatus, as described above, sometimes cannot perform demodulation processing or frame synchronization establishment under a strongly fading environment.

SUMMARY OF THE INVENTION

According to one of the aspects of an embodiment, an OFDM receiver apparatus for receiving an OFDM signal including a plurality of DBPSK signals transmitting identical information, and comprises an extraction unit for extracting a plurality of DBPSK signals from the OFDM signal, a phase difference calculation unit for calculating a phase difference between symbols for each of the plurality of extracted DBPSK signals, an accumulation unit for accumulating the plurality of phase differences obtained by the phase difference calculation unit, and a decision unit for deciding data transmitted by the DBPSK signal on the basis of an accumulation result obtained by the accumulation unit.

According to another of the aspects of an embodiment, an OFDM receiver apparatus for receiving an OFDM signal transmitting control information data stored in a frame with a prescribed length, and comprises an extraction unit for extracting control information data from the OFDM signal, a holding unit for sequentially holding a prescribed bit of each of the control information data, a correlation unit for calculating correlation of the data held in the holding unit and prepared known data, an addition unit for cumulatively adding a correlation value obtained by the correlation unit in a frame period, and a synchronization detection unit for outputting a synchronization signal indicating establishment of frame synchronization when the cumulative correlation value obtained by the addition unit exceeds a preset threshold.

According to other of the aspects of an embodiment, an OFDM receiver apparatus for receiving an OFDM signal for transmitting control information data stored in a frame with a prescribed length, and comprises an extraction unit for extracting control information data from the OFDM signal, a correlation unit for calculating for every frame a correlation between synchronization data in the control information data and prepared known data, an accumulation unit for accumulating a prescribed number of latest correlation values obtained by the correlation unit, and a synchronization detection unit for outputting a failure signal indicating that frame synchronization is broken when an accumulation result of the accumulation unit becomes smaller than a preset threshold.

BRIEF DESCRIPTION OF THE DRAWINGS

FIG. 6 is a diagram showing a detailed structure of the TMCC data;

FIG. 8 is an implementation of the data decision of the embodiment;

FIG. 11 is a flowchart showing the operation of the phase difference addition unit;

FIG. 15 is an implementation of memory to which the synchronization unit refers;

FIG. 16 is a flowchart showing processing of detecting frame synchronization; and FIG. 17 is a diagram explaining a method for monitoring synchronization.

DESCRIPTION OF THE PREFERRED EMBODIMENTS

Figure 4:
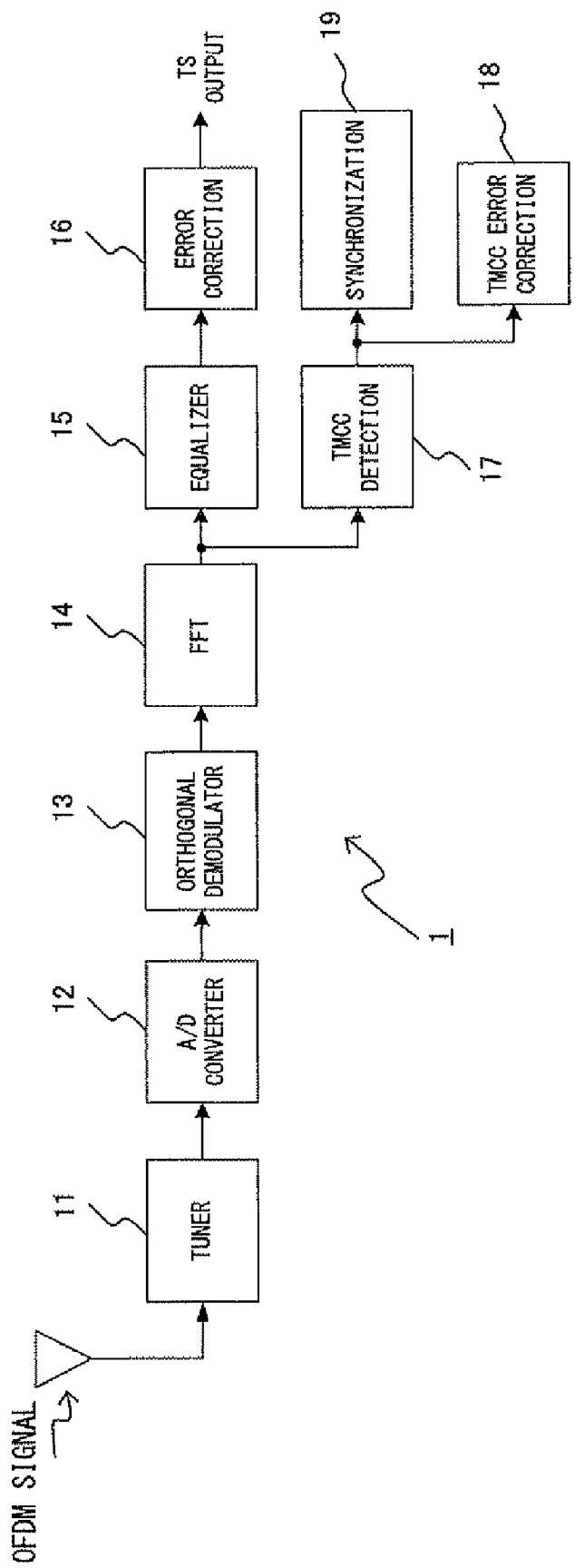
FIG. 4 is a diagram showing a configuration of an OFDM receiver apparatus of the embodiments.

FIG. 4 is a diagram showing a configuration of an OFDM receiver apparatus of the embodiments. Assume that the OFDM receiver apparatus 1 is a terminal apparatus used in the digital terrestrial broadcasting system in Japan (ISDB-T), although it is not particularly limited. In the digital terrestrial broadcasting in Japan, signals such as a data signal, an SP (Scattered Pilot) signal, an AC (Auxiliary Channel) signal, and a TMCC (Transmission and Multiplexing Configuration Control) signal are transmitted. Here, the OFDM signal transmits plural data signals and plural TMCC signals. The plural data signals basically transmit information, which is different from one another. On the other hand, the TMCC signals transmit identical information in parallel. These signals are transmitted with the use of carrier waves which have frequencies different from one another.

In the OFDM receiver apparatus 1 shown in FIG. 4, the received OFDM signal is provided to a tuner 11. The tuner 11 selects a signal in a desired channel from the received signal, and outputs the signal after converting the signal into a signal in an IF (Intermediate Frequency) band. An A/D converter 12 converts the output signal of the tuner 11 into a digital signal. The digital signal is converted into a complex baseband signal by an orthogonal demodulator 13. The complex baseband signal, which is a time-domain signal, is converted into a frequency-domain signal by an FFT circuit 14. In other words, the data signal, the SP signal, the AC signal, and the TMCC signal are extracted by the FFT circuit 14. At that time the FFT circuit 14 executes the FFT processing in units of symbols.

The data signal and the SP signal are provided to an equalizer unit 15. The SP signal is a known signal, which has the transmission phase and the transmission power being determined in advance, and is used for synchronous detection and estimation of transmission path. The equalizer unit 15 performs interpolation processing of the SP signal, and equalizes the data signal using the result of the interpolation processing. "Equalizing" includes correction processing of phase rotation that occurs on a transmission path. The equalized data signal is converted into 1-bit or plural-bit binary data with respect to each symbol, and is output in a TS (Transform Stream) format after correction processing by an error correction unit 16.

A TMCC detection unit 17 detects TMCC data from the TMCC signal. Details of the configuration and operation of the TMCC detection unit 17 are explained later. A TMCC error correction unit 18 executes error correction processing of the TMCC data. A synchronization unit 19 detects the frame synchronization using the TMCC data. Details of the configuration and operation of the synchronization unit 19 are explained later as well. Note that a control unit not shown in the drawing obtains control information relating to a communication method by analyzing the TMCC data, and controls the reception operation by using the control information.

In the digital terrestrial broadcasting, as described above, plural TMCC signals for transmitting the same information are transmitted in parallel. Consequently, the TMCC detection unit 17 detects and outputs the plural TMCC data in parallel. In one of the embodiments, four identical TMCC signals are transmitted in one segment. Accordingly, in one-segment broadcasting, four TMCC signals are transmitted, and in 13-segment broadcasting, 52 TMCC signals are transmitted.

Figure 5:
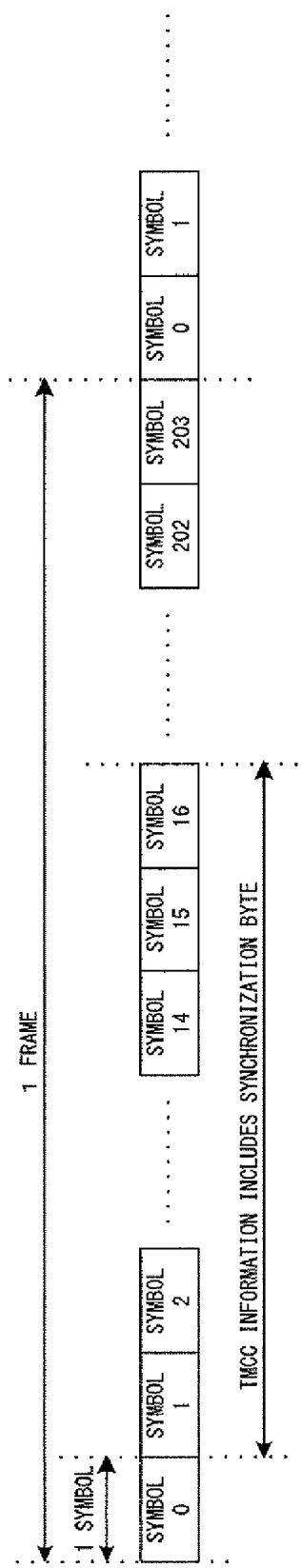
FIG. 5 is a diagram showing a data structure of TMCC.

FIG. 5 is a diagram showing a data structure of TMCC. FIG. 6 is a diagram showing a detailed structure of TMCC data. As shown in these drawings, a set of TMCC data is stored in one frame and is transmitted. One frame transmits 204 symbols. Here, TMCC data is transmitted by DBPSK. Therefore, the data length of a set of the TMCC data (i.e. frame length) is 204 bits. Using the first through the sixteenth symbols of each frame, synchronization data is transmitted.

Basically, TMCC signals transmit the same TMCC data repeatedly. However the synchronization data is "w0=0011010111101110" or "w1=1100101000010001". "w0" and "w1" are alternately transmitted in successive frames. Note that "w1" is obtained by inverting each bit of "w0". In a case of changing the control information relating to the communication method, using a "transmission parameter switching index" the receiver apparatus is notified of the change by the transmitter apparatus. Specifically, when changing the control information, the transmitter apparatus decrements the "transmission parameter switching index" of each frame from "1111". When the index becomes "0000", the control information is changed. Afterwards, the same TMCC data (except for the synchronization data) is transmitted repeatedly.

Details of the operation of the OFDM receiver apparatus of the embodiments are explained. In the following description, a method for deciding each bit of TMCC data is explained. Here, "data decision" refers to a decision of whether the received data is "0" or "1". Next, a method for establishing frame synchronization using the obtained TMCC data will be explained.

<Data Decision>

Figure 7:
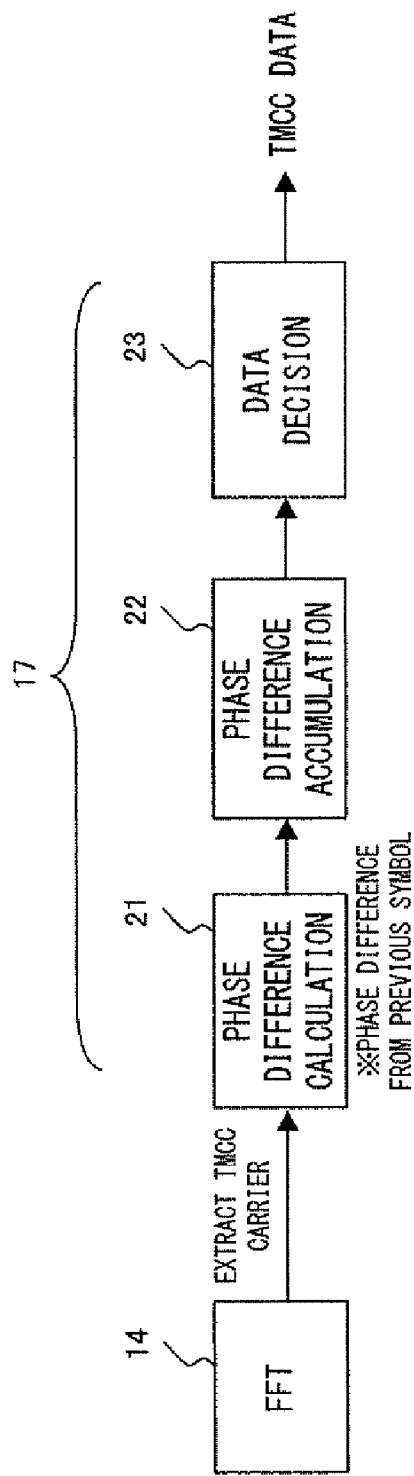
FIG. 7 is a diagram explaining a data decision method of the embodiment.

FIG. 7 is a diagram explaining a data decision method of the embodiment. Here, the data decision is performed in the TMCC detection unit 17. Note that in the TMCC detection unit 17, plural TMCC signals are provided from the FFT circuit 14.

A phase difference calculation unit 21 sequentially calculates phase differences between symbols of every TMCC signals. In other words, the phase difference calculation unit 21 outputs plural phase difference values ($\Delta\phi1$, $\Delta\phi2$, . . . ). Here the TMCC signal is a DBPSK modulated signal. In DBPSK, the phase difference between two successive symbols is "zero" or "$\pi$". As an example, in a case of transmitting "0" using a symbol N when the phase of a symbol N−1 is "$\theta$", the phase of the symbol N is set to "$\theta$". On the other hand, in a case of transmitting "1" using the symbol N when the phase of the symbol N−1 is "$\theta$", the phase of the symbol N is set to "$\theta+\pi$". The OFDM receiver apparatus 1, therefore, can regenerate transmitted data by detecting the phase difference between symbols.

However, in general, the phase of a radio signal changes on a radio channel. Under the strongly fading environment in particular, it is possible that the phase of the radio signal changes significantly. Because the frequencies of the carrier waves of the plural TMCC signals are different from one another, amounts of phase changes that occur on the channels should be also different from one another. Accordingly, the plural phase difference values obtained by the phase difference calculation unit 21 are not necessarily the same, and each of the phase difference values is not always "zero" or "$\pi$".

A phase difference accumulation unit 22 accumulates the plural phase difference values obtained by the phase difference calculation unit 21. A data decision unit 23 determines whether the transmitted data is "0" or "1" based on the accumulated value obtained by the phase difference accumulation unit 22.

Figure 1:
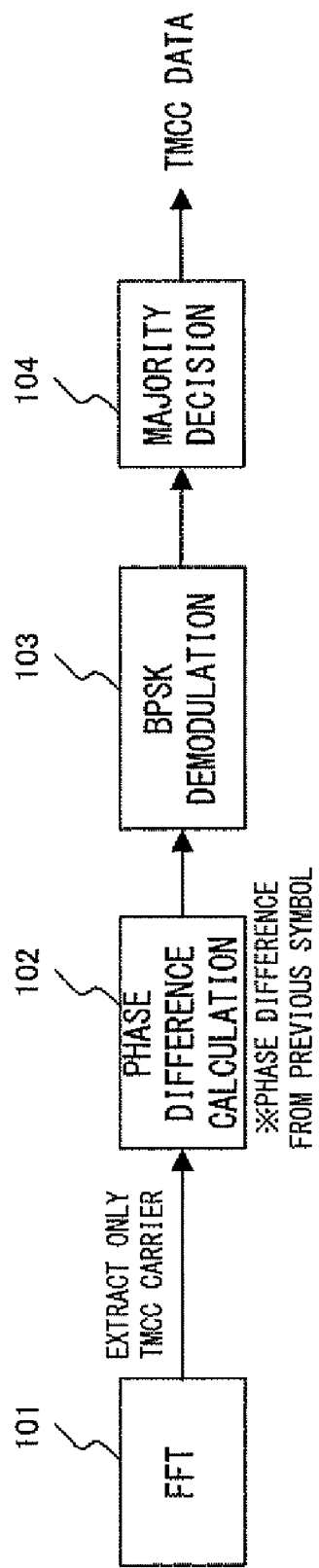
FIG. 1 is a diagram explaining a conventional data decision method.
Figure 2:
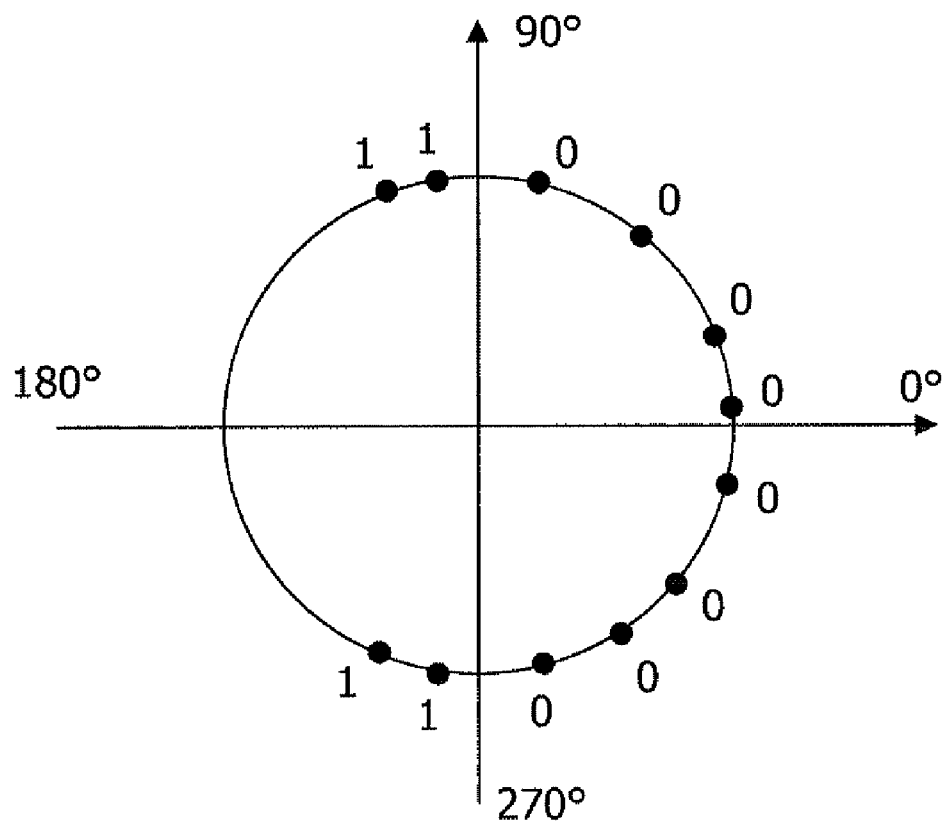
FIG. 2 shows an example of data decision according to the related art.
Figure 3:
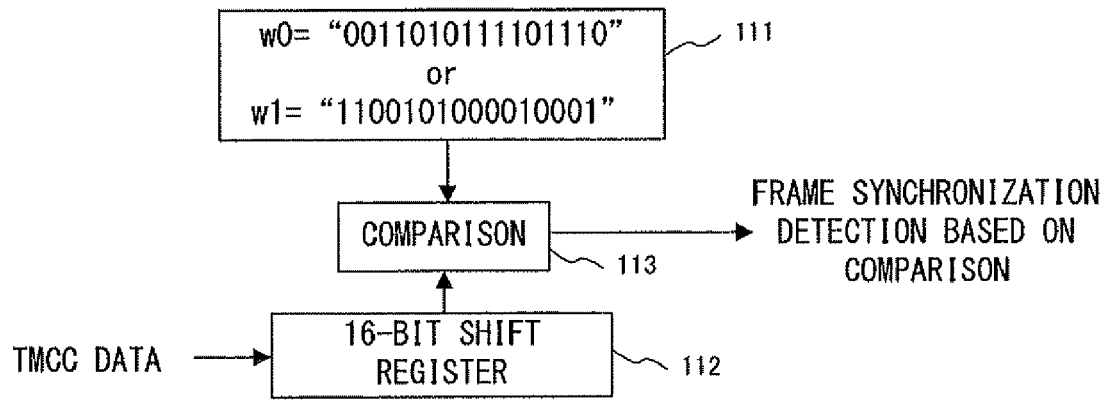
FIG. 3 is a diagram explaining a conventional frame synchronization detection method.

Now, a data decision method of the embodiment is explained with reference to FIG. 8. Note that in the embodiment, twelve TMCC signals are transmitted in parallel. In other words, in order to demodulate one symbol, twelve phase difference values are provided to the phase difference accumulation unit 22. The phase difference values are represented by values from "−1024" to "+1024". In DBPSK, a threshold for the data decision is generally 90 degrees and 270 degrees as shown in FIG. 2. Therefore, both 90 degrees and 270 degrees are converted into "0". A range from 90 degrees to 270 degrees corresponds to an area indicating positive numbers, and a range from 270 degrees to zero degree and a range from zero degree to 90 degrees correspond to an area indicating negative numbers. Additionally, zero degree is converted into "−1024", and 180 degrees is converted into "+1024".

In the embodiment, twelve phase difference values, "+230", "+140", "−150", "−450", "−750", "−950", "−730", "−580", "−450", "−150", "+130", and "+220", are obtained by the phase difference calculation unit 21. Therefore, the value accumulated by the phase difference accumulation unit 22 is "−3490". The data decision unit 23 performs data decision based on the "sign" of the accumulated value of the phase accumulation unit 22. Here, if the accumulated value is a positive number, the data is decided to be "1", and if the accumulated value is a negative number, the data is decided to be "0". Accordingly, the data is decided to be "0" in the example shown in FIG. 8.

As described above, in the OFDM receiver apparatus 1 of the embodiment, the data is decided based on the result of accumulation of the plural phase difference values. At that time, each of the phase difference values is converted into a numerical system, in which 90 degrees and 270 degrees are set to be "0". Therefore it is possible to decide the data based on the "sign" of the accumulated value. In addition, because large weight is given to highly reliable TMCC signals (i.e. TMCC signals with the phase difference being close to "0" or "$\pi$"), the data decision accuracy can be improved.

Figure 9:
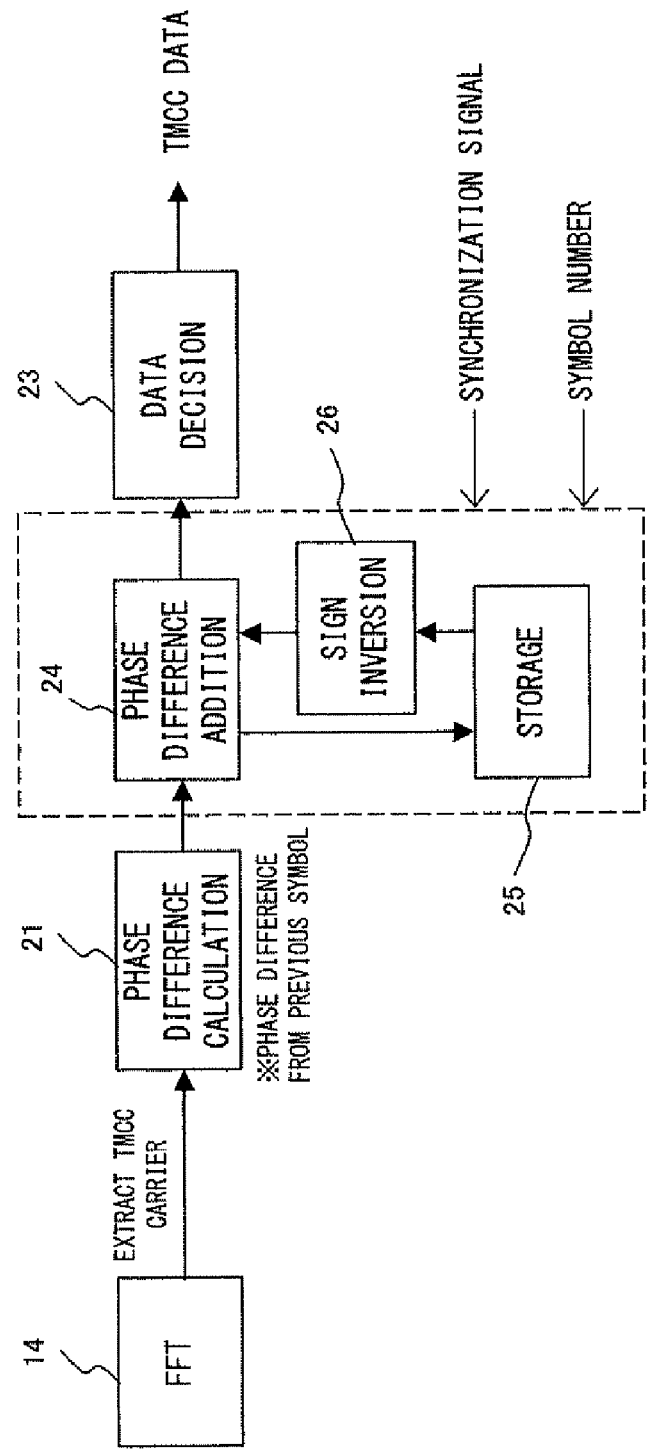
FIG. 9 is a diagram explaining a data decision method of another embodiment.

FIG. 9 is a diagram explaining a data decision method of another embodiment. In the method explained with reference to FIG. 7, the data is decided in each symbol. In the method shown in FIG. 9, on the other hand, the phase difference accumulated values of the symbols in plural frames is cumulatively added, and the data is decided based on the cumulative value. However, this method has to be performed when frame synchronization is established.

In FIG. 9, a phase difference addition unit 24 cumulatively adds the phase difference accumulated values of respective symbol number in plural frames. At that time, the phase difference addition unit 24 adds the accumulated value of a new symbol to the cumulative value read from a storage unit 25, and generates a new cumulative value. The storage unit 25 stores the new cumulative value calculated in the phase difference addition unit 24. A sign inversion unit 26 inverts the sign of the cumulative value read from the storage unit 25 when performing the data decision of the synchronization data.

Figure 10:
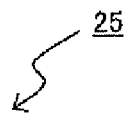
FIG. 10 is an embodiment of the storage unit.

FIG. 10 is an embodiment of the storage unit 25. The storage unit 25 stores cumulative values each with a respective symbol number. The symbol number, here, corresponds to the bit number for identification of each bit of TMCC shown in FIG. 6. The cumulative value is represented by binary data with a prescribed bit length. When the cumulative value exceeds a range of numerical values represented by the binary data, only the higher-order bit values are stored. However, "sign" must be always added to the stored value.

FIG. 11 is a flowchart showing the operation of the phase difference addition unit 24. The processing in the flowchart is executed when the phase difference values of a new symbol is input. Note that as described above, because plural TMCC signals are transmitted in parallel in the digital terrestrial broadcasting, plural phase difference values are input in one symbol.

In step S1, a symbol number for identifying the symbol, on which the data decision is to be performed, is detected. The symbol number (0-203) is provided from the synchronization unit 19 shown in FIG. 4. Here, assume that a new symbol is not synchronization data (i.e. the symbol number is not 1-16). In step S2, a previous cumulative value of the detected symbol number is extracted from the storage unit 25. In step S3, a new cumulative value is generated by adding a new phase difference accumulated value to the previous cumulative number extracted from the storage unit 25. In step S4, the new cumulative value is output to the data decision unit 23. In step S5, the new cumulative value is written in the storage unit 25.

Basically, each of the TMCC signals transmits identical TMCC data repeatedly, as described above. In other words, the symbols with the same symbol number transmit the same value (0/1) continuously. For example, if data of symbol K in frame N is "1", then data of symbol K in following frames N+1, N+2, N+3, . . . are to be "1", until TMCC data is changed. By utilizing this characteristic, the method shown in FIG. 9 improves the accuracy of the data decision.

Figure 12:
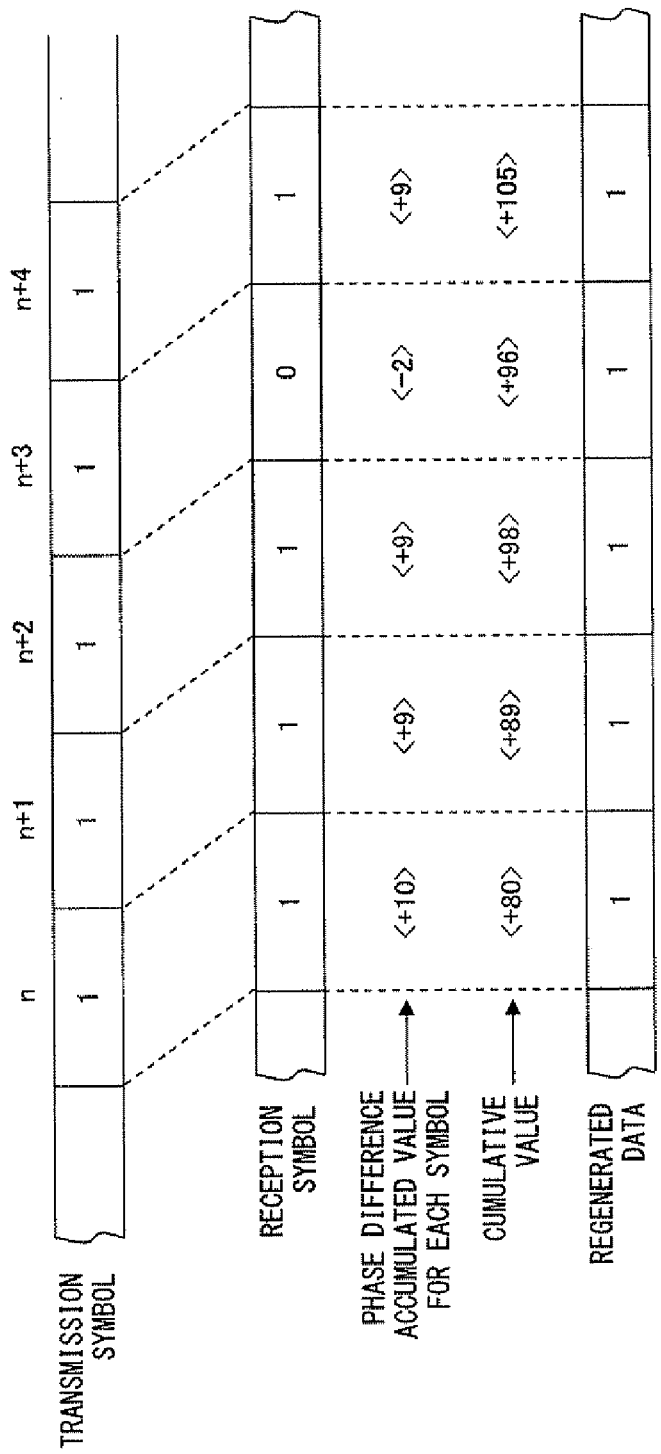
FIG. 12 is a diagram explaining an effect of the another embodiment.

Assume that symbols with a certain symbol number transmit "1" successively in frames n, n+1, n+2, . . . , as shown in FIG. 12. In such a case, the phase difference accumulated value obtained from each of the symbols is "a positive value". Therefore, the cumulative result of the accumulated values should be "a large positive value". Now, assume that strong fading occurs in the frame n+3, and the phase of the carrier wave fluctuates. As a result, the phase difference accumulated value in the frame n+3 has "a negative value" However, the cumulated value is "+96 (a positive value)". Therefore, the data transmitted by the symbol is decided to be "1".

According to the method, as described above, the transmission data can be regenerated accurately even under strongly fading environment.

However, in the synchronization data of the first through the sixteenth symbols of the TMCC data, "w0" and "w1" alternate being transmitted in successive frames. "w1" is obtained by inverting each bit in "w0". Therefore, when the symbols on which the data decision is to be performed is synchronization data, the cumulative value readout from the storage unit 25 has its sign controlled in accordance with the frame number. The control of the sign of the cumulative value is executed by the sign inversion unit 26.

In a case that there is a change in the contents of the TMCC data, it is not preferable to employ the method shown in FIG. 9. Here, in a case of changing the control information relating to the communication method, as described above, the receiver apparatus is notified of the change by the transmitter apparatus using "transmission parameter switching index". Specifically, the transmitter apparatus, when changing the control information, decrements "transmission parameter switching index" of each frame from "1111". When the index becomes "0000", the control information is changed. Consequently, the OFDM receiver apparatus 1 can detect the timing of the change in the contents of TMCC data by analyzing the TMCC data and by monitoring "transmission parameter switching index".

Figure 13:
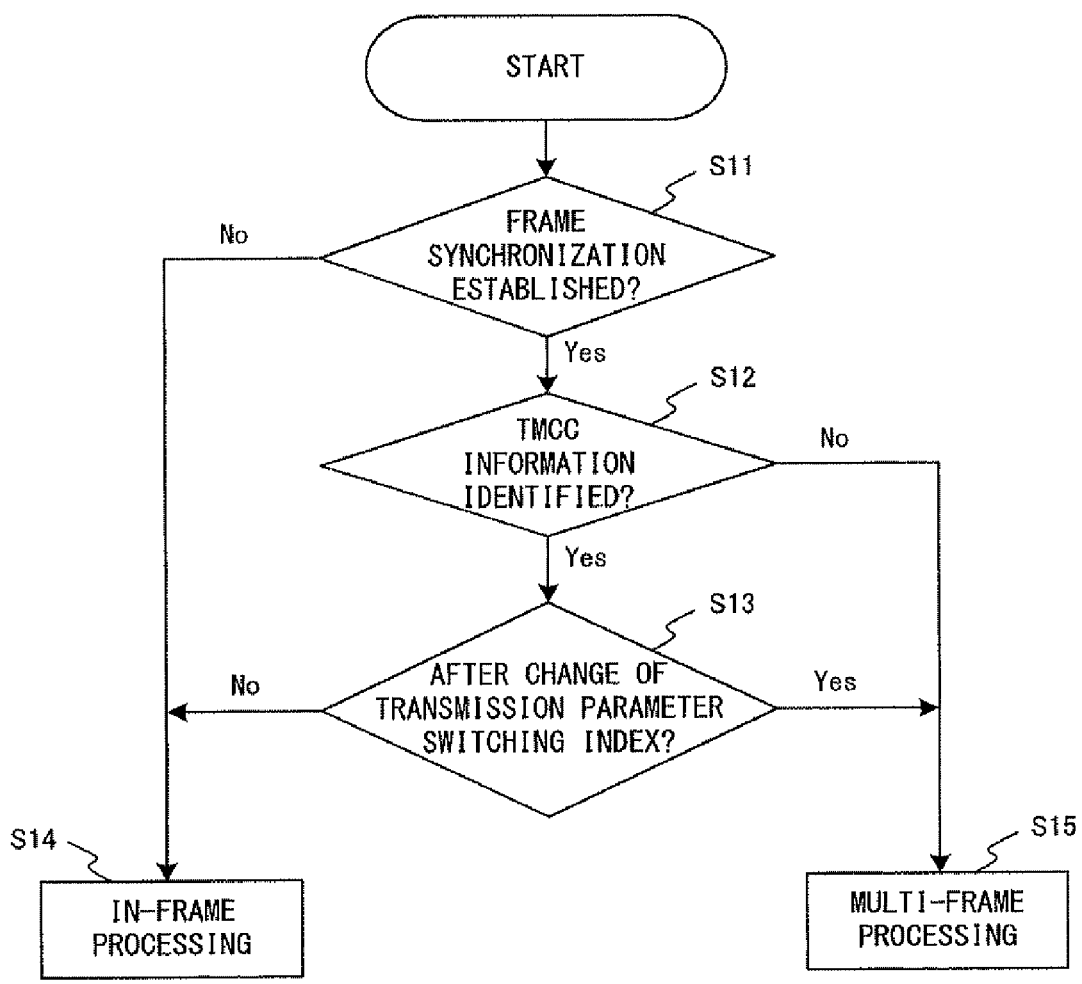
FIG. 13 is a flowchart showing the method of switching in-frame processing and multi-frame processing.

FIG. 13 is a flowchart showing the method of switching in-frame (intra-frame) processing and multi-frame (inter-frame) processing. The in-frame processing is the data decision method explained with reference to FIG. 7, and data is decided based on the phase difference accumulated value of one single symbol. On the other hand, the multi-frame processing is the data decision method explained with reference to FIG. 9, and data is decided based on the cumulative value obtained from plural frames.

In step S11, whether frame synchronization is established or not is checked. Whether the frame synchronization is established or not is notified from the synchronization unit 19 shown in FIG. 4. If the frame synchronization is not established, the processing proceeds to step S14, and the in-frame processing is executed.

If the frame synchronization is established, in step S12, whether the TMCC information is identified or not is checked. Whether the TMCC information is identified or not is determined in the TMCC error correction unit 18. When there is no error in the TMCC data, it is determined that the TMCC information is identified. If the TMCC information is not identified, the processing proceeds to step S15, and the multi-frame processing is performed.

When the TMCC information is identified, in step S13, whether it is immediately after a change of "transmission parameter switching index" or not is checked. Until a prescribed time period after the change of "transmission parameter switching index", the multi-frame processing is executed in step S15, and afterwards, the in-frame processing is performed in step S14.

It should be noted that in the present embodiment, the multi-frame processing is executed while the frame synchronization is established and only within a time period from the time when the TMCC information is changed to the time when the TMCC information is identified. According to the procedure, it is possible to prevent wrong TMCC information from being regenerated when the TMCC information changes.

According to the configuration and the method explained with reference to FIG. 7-FIG. 13, accurate decision of TMCC data is possible even under a strongly fading environment.

<Detection of Frame Synchronization>

The TMCC data regenerated by the above method is provided to the synchronization unit 19 shown in FIG. 4. The synchronization unit 19 detects frame synchronization using the TMCC data.

Figure 14:
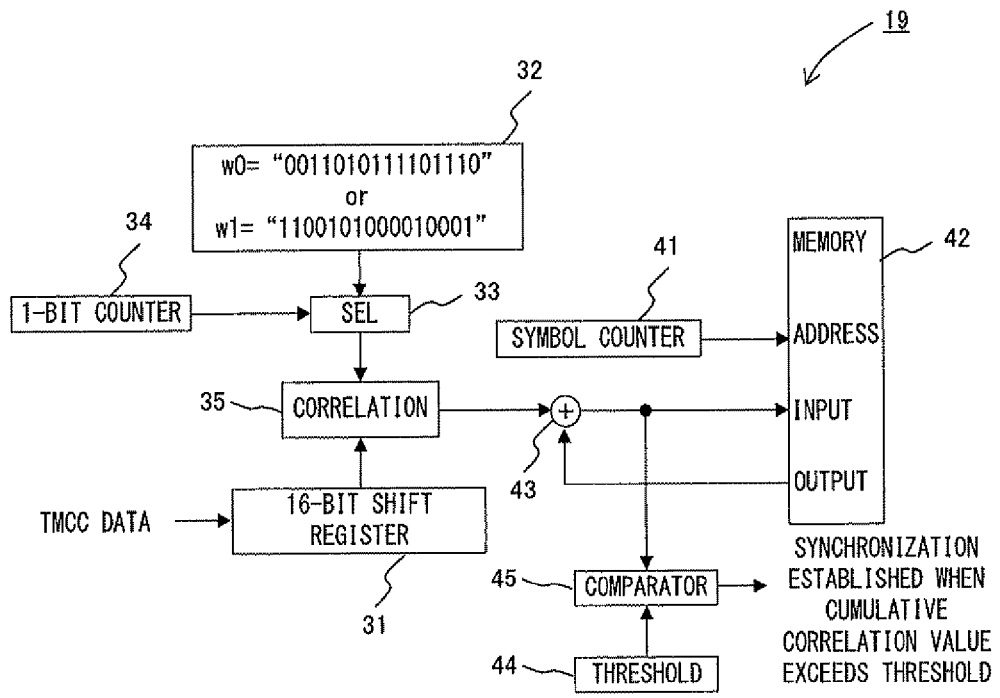
FIG. 14 is a diagram explaining a method of detecting frame synchronization.

FIG. 14 is a diagram explaining a method of detecting frame synchronization. The detection of frame synchronization is performed by the synchronization unit 19. Note that in FIG. 14, only the elements necessary for processing to detect frame synchronization are described.

A shift register 31 sequentially holds sixteen bits of each TMCC data. A known data register 32 stores a pair of known data w0 and w1. The known data w0 and w1 are synchronization data alternately set in each of frames in the first through the sixteenth bits of the TMCC data in the transmission apparatus. A selector 33 selects the known data w0 or w1 according to an output signal from a 1-bit counter 34. That is, the selector 33 selects the known data w0 and w1 alternately.

A correlation unit 35 calculates correlation between the known data selected by the selector 33 and the 16-bit data held by the shift register 31. Here, the correlation unit 35 outputs the result, which is the number of the matched bits in the pair of data subtracted by "8", as "a correlation value". The correlation value is a value within a range from "−8" to "+8", and a large absolute value indicates high correlation. As an example, if "w0: 0011010111101110" is selected by the selector 33 and the 16-bit data held in the shift register 31 is "D1: 0111010111101100" at a certain timing, the second bit and the fifteenth bit are different from each other. In other words, the other fourteen bits match one another. Therefore, in this case, "6(=14−8)" is output as a correlation value.

Note that in the stage before the establishment of the frame synchronization, the OFDM receiver apparatus 1 cannot specify whether the synchronization data of a newly received frame is either "w0" or "w1". However, whichever the known data w0 or w1 is selected by the selector 33, the absolute value of the correlation value should be the same. That is, when the above 16-bit data D1 and the known data w1 are provided to the correlation unit 35, only the second bit and the fifteenth bit match one another. Therefore, in this case, "−6(2−8)" is output as a correlation value.

The above correlation processing is recursively performed with the 16-bit data held by the shift register 31 being shifted one by one. Consequently, when the correlation processing is performed on one frame of TMCC data, 204 correlation values are output.

A symbol counter 41 cyclically counts "a symbol number (0-203)". The symbol number identifies the storage address of memory 42. The symbol counter 41 starts a count-up operation upon the start of the correlation calculation of the correction unit 35. For that reason, the symbol number output from the symbol counter 41 does not normally match the bit number of TMCC data.

The memory 42 stores 204 correlation values (or a cumulative value of the correlation values) as shown in FIG. 15. Here, as an example, the correlation calculation of the thirty-first through the forty-sixth bits of TMCC data by the correlation unit 35 is started. Then, "symbol number=0" is assigned to the correlation value of the thirty-first through the forty-sixth bits of the TMCC data. When the correlation value of the thirty-second through the forty-seventh bits of the TMCC data is calculated, "symbol number=1" is assigned to the correlation value. These correlation values sequentially correspond to the symbol numbers, and are stored in the memory 42. Afterwards, other correlation values are calculated and stored in the memory 42 in the same manner.

An addition unit 43 cumulatively adds the correlation values of each symbol. In other words, a new correlation value is added to the correlation value (or the cumulative value) of the respective symbol number extracted from the memory 42.

A threshold register 44 holds a predetermined threshold. A comparator 45 compares the cumulative correlation value obtained by the addition unit 43 with the threshold. When the cumulative correlation value exceeds the threshold, a synchronization establishment signal that indicates detection of frame synchronization is output.

In the synchronization unit 19 of the above configuration, the absolute value of the correlation value is maximized when the synchronization data of TMCC data is held in the shift register 31. At this point, the OFDM receiver apparatus 1 cannot specify whether the synchronization data of the newly received frame is "w0" or "w1". However, the transmission apparatus transmits "w0" and "w1" alternately as synchronization data, and the selector 33 selects the "w0" and "w1" alternately as known data. As a result, if the known data and the synchronization data in a frame match one another and "a positive value" is obtained as a correlation value, "the positive values" should be obtained likewise in the subsequent frames. On the contrary, if the known data is the inversion of the synchronization data, and "a negative value" is obtained as a correlation value, "the negative values" should be obtained likewise in the subsequent frames. Therefore, the absolute value of the cumulative correlation value becomes larger as new correlation values are added. Because the absolute value of each of the correlation values is large, when the correlation values are cumulatively added, the rate of increase in the absolute value of the correlation value should be fast.

On the other hand, when the 16-bit data held in the shift register 31 is not synchronization data, the absolute value of the correlation value becomes small. In addition, the obtained correlation value is highly probable to alternate its sign in successive frames. Therefore, in such a case, when the correlation values are cumulatively added, the absolute value does not become very large. At least, the rate of increase of the absolute value of the correlation value is slow.

In the synchronization detection method of the embodiment, the timing when the absolute value of the cumulative correlation value exceeds the threshold is determined to be the frame synchronization timing, and the synchronization establishment signal is output. Here, the timing when the synchronization establishment signal is output is the timing when the sixteenth bit of the TMCC data is input. Note that if the absolute value of the above cumulative correlation value does not exceed the threshold within a prescribed monitoring period, it is determined that the frame synchronization cannot be established, and a synchronization failure signal is output. In such a case, the status of the OFDM receiver apparatus 1 is initialized. As a result, it is possible to detect synchronization immediately after a fading environment is improved without spending unnecessarily long time to detect frame synchronization.

By setting a certain small value as the threshold, it is possible to detect frame synchronization in a shorter time period than the monitoring period under an environment where influence of fading is less significant. Assume, as an example, that the monitoring period is four-frame time period, and the threshold is ±15. In such a case, if "+8" is successively obtained as the correlation values under the environment where the influence of fading is less significant, the synchronization can be detected in the second frame. Under an environment where influence of fading is significant, as an example, if "+7", "+6", "+1" and "+5" can be obtained as the correlation values, the cumulative added value is "+19", and it is possible to detect the synchronization in the fourth frame. Note that while the synchronization data (i.e. the first through the sixteenth bits of TMCC data) is held by the shift register 31, the quality degradation cannot occur as the signal inverts (i.e. as bit errors larger than 8 bits occurs), and therefore frame synchronization can be fully detected even under the strongly fading environment.

FIG. 16 is a flowchart showing processing of detecting frame synchronization. The processing is performed recursively for every symbol time.

In step S21, input of a new symbol is waited. In other words, input of the next bit of TMCC data is waited. In step S22, a correlation value of 16-bit data including the new bit is calculated. In step S23, whether the correlation value obtained in step S22 is the first correlation value of the current symbol number or not is checked. If the correlation value is the first correlation value, in step S24, the correlation value is written in a corresponding address in the memory 42. On the other hand, if the correlation value is not the first correlation value (i.e. if the correlation value of the same symbol number has been calculated in advance), in step S25, the correlation value (or the cumulative value) is read out from the corresponding address in the memory 42. In step S26, the correlation value readout from the memory 42 is added with the new correlation value obtained in step S22. In step S27, the added result is written in the corresponding address of the memory 42.

In step S28, the correlation value written in the memory 42 in step S24 or in step S27 is compared with a threshold. When the correlation value exceeds the threshold, in step S31, the synchronization establishment signal indicating the detection of frame synchronization is output. On the other hand, if the correlation value equals to or smaller than the threshold, in step S29, whether a prescribed monitoring period has past since the start of the correlation processing or not is checked. The monitoring time is a several frame time periods, for example. If the monitoring time has not past, the processing returns to step S21 and waits for the next symbol. If the monitoring time has past, in step S30, a synchronization failure signal indicating that frame synchronization cannot be detected is output.

<Detection of Synchronization Misalignment>

The synchronization unit 19, after the frame synchronization is detected as described above, monitors whether the synchronization is maintained or not. In the following description, a method for monitoring synchronization is explained with reference to FIG. 17.

Calculation of the correlation value is basically the same as the calculation explained with reference to FIG. 14. However, because the frame synchronization is established, it is possible to extract synchronization data from TMCC data. In other words, when the synchronization data is held by the shift register 31, the 16-bit data held in the shift register 31 is transmitted to the correlation unit 35 at the same timing. Consequently, a correlation value of the 16-bit data and the known data is output.

A correlation value register 51 holds m sets of the latest correlation values. An accumulated value register 52 holds an accumulated value of the m sets of the latest correlation values. An addition unit 53, when a new correlation value is output from the correlation unit 35, adds the new correlation value to the accumulated value held in the accumulated value register 52. A subtraction unit 54 subtracts the oldest correlation values held in the correlation value register 51 from the accumulated value held in the accumulated value register 52. As a result, the accumulated value of them sets of the latest correlation values is calculated.

In a threshold value register 55, a predetermined threshold. A comparator 56 compares the accumulated value of the m sets of the latest correlation values with the threshold. If the accumulated value equals to or is larger than the threshold, it is determined that the frame synchronization is maintained. On the other hand, if the accumulated value is smaller than the threshold, it is determined that the frame synchronization is broken, and the comparator 56 outputs the synchronization failure signal.

It should be noted that the above data decision function and the synchronization detection function are realized by DSP, for example, although they are not limited in particular. These functions may be realized by combination of software and hardware.

In the above embodiments, although an OFDM signal of the digital terrestrial broadcasting system in Japan is explained, the present invention is not limited to the above embodiments, but may be applied to DVB-T, and DVB-H etc., which are the digital terrestrial broadcasting in Europe. Note that in the digital terrestrial broadcasting in Europe, control information corresponding to the TMCC data is referred to as TPS (Transmission Parameter Signaling).

Additionally in the above embodiments, although a method for demodulating a DBPSK signal is explained, the present invention is not limited to the method, but may be applied to a modulator for modulating a DxPSK (e.g. DQPSK) signal.

What is claimed is:

1. An orthogonal frequency division multiplexing (OFDM) receiver apparatus for receiving an OFDM signal including a plurality of differential binary phase shift keying (DBPSK) signals transmitting identical information, comprising:
    an extraction unit which extracts the plurality of DBPSK signals from the OFDM signal;
    a phase difference calculation unit which calculates a phase difference between symbols of each of the plurality of extracted DBPSK signals;
    an accumulation unit which accumulates the plurality of phase differences obtained by the phase difference calculation unit; and
    a decision unit which decides data transmitted by the DBPSK signals based on a sign of an accumulated value which is an accumulation result obtained by the accumulation unit, wherein
    the DBPSK signal transmits a frame in a prescribed format,
    the accumulation unit cumulatively adds an accumulation result of a corresponding symbol in each frame in a plurality of frames, and
    the decision unit decides data transmitted by the DBPSK signal based on the cumulative addition result.

2. The OFDM receiver apparatus according to claim 1, wherein
    the DBPSK signal is a control information signal of a digital terrestrial broadcasting system.

3. The OFDM receiver apparatus according to claim 2, wherein
    the control information signal is a transmission and multiplexing configuration control (TMCC) signal.

4. The OFDM receiver apparatus according to claim 1, wherein
    the accumulation unit cumulatively adds the accumulation result of a plurality of frames when frame synchronization is established.

5. The OFDM receiver apparatus according to claim 1, wherein
    the accumulation unit cumulatively adds the accumulation result of a plurality of frames for a prescribed time period after information stored in the frames is changed.

6. An orthogonal frequency division multiplexing (OFDM) receiver apparatus for receiving an OFDM signal including a plurality of differential binary phase shift keying (DBPSK) signals transmitting identical information, comprising:
    an extraction unit which extracts the plurality of DBPSK signals from the OFDM signal;
    a phase difference calculation unit which calculates a phase difference between symbols of each of the plurality of extracted DBPSK signals;
    an accumulation unit which accumulates the plurality of phase differences obtained by the phase difference calculation unit; and
    a decision unit which decides data transmitted by the DBPSK signals based on an accumulation result obtained by the accumulation unit, wherein
    the phase difference is represented by using a quantifying system in which a phase difference of 90 degrees or of 270 degrees corresponds to zero, a phase difference between 90 degrees and 270 degrees corresponds to a positive number area, and a phase difference between 270 degrees and zero degree or between zero degree and 90 degrees corresponds to a negative number area, and
    an absolute value of a number corresponding to 180 degrees is a maximum in the positive number area, and an absolute value of a number corresponding to zero degree is a maximum in the negative number area.

7. The OFDM receiver apparatus according to claim 6, wherein
the DBPSK signal is a control information signal of a digital terrestrial broadcasting system.

8. The OFDM receiver apparatus according to claim 7, wherein
the control information signal is a transmission and multiplexing configuration control (TMCC) signal.

9. An orthogonal frequency division multiplexing (OFDM) receiver apparatus for receiving an OFDM signal transmitting control information data stored in a frame with a prescribed length, comprising:
an extraction unit which extracts control information data from the OFDM signal;
a holding unit which sequentially holds a prescribed bit of the control information data;
a correlation unit which calculates correlation of the data held in the holding unit and prepared known data;
an addition unit which cumulatively adds a correlation value obtained by the correlation unit in a frame period; and
a synchronization detection unit which outputs a synchronization signal indicating establishment of frame synchronization when the cumulative correlation value obtained by the addition unit exceeds a preset threshold, wherein
the addition unit has memory which stores each cumulative correlation value of each bit constituting a frame, and every time a new correlation value is calculated, adds the new correlation value to a corresponding cumulative correlation value stored in the memory.

10. The OFDM receiver apparatus according to claim 9, wherein
the synchronization detection unit outputs a failure signal indicating synchronization failure when the cumulative correlation value does not exceeds the threshold within a prescribed time period.

11. An orthogonal frequency division multiplexing (OFDM) receiver apparatus for receiving an OFDM signal transmitting control information data stored in a frame with a prescribed length, comprising:
an extraction unit which extracts control information data from the OFDM signal; and
a synchronization detection unit which detects an establishment of frame synchronization on the basis of the control information data, wherein
the synchronization detection unit includes:
a correlation unit which calculates for every frame a correlation between synchronization data extracted from the control information data by the establishment of the frame synchronization and prepared known data, after the detection of the establishment of the frame synchronization;
an accumulation unit which accumulates a prescribed number of latest correlation values obtained by the correlation unit; and
a synchronization breaking detection unit which outputs a failure signal indicating that the frame synchronization is broken when an accumulation result of the accumulation unit becomes smaller than a preset threshold.

12. The OFDM receiver apparatus according to claim 11, wherein
the accumulation unit has a shift register for sequentially holding the prescribed number of correlation value, subtracts the oldest correlation value held in the shift register from a previous accumulation result, and adds a correlation value newly obtained by the correlation unit.

* * * * *